(12) United States Patent
Bluem et al.

(10) Patent No.: US 8,798,421 B2
(45) Date of Patent: Aug. 5, 2014

(54) COLOR SHIFTING MULTILAYER POLYMER FIBERS AND SECURITY ARTICLES CONTAINING COLOR SHIFTING MULTILAYER POLYMER FIBERS

(75) Inventors: Gregory L. Bluem, St. Paul, MN (US); Joan M. Frankel, Woodbury, MN (US); David C. Kramlich, Roseville, MN (US); Robert L. Brott, Woodbury, MN (US); Shandon D. Hart, Corning, NY (US); Lynn E. Lorimor, Minneapolis, MN (US); Patrick R. Fleming, Lake Elmo, MN (US); William J. Kopecky, Hudson, WI (US); Bruce B. Wilson, Woodbury, MN (US); James M. Jonza, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 753 days.

(21) Appl. No.: 12/919,177

(22) PCT Filed: Mar. 2, 2009

(86) PCT No.: PCT/US2009/035685
§ 371 (c)(1),
(2), (4) Date: Jan. 13, 2011

(87) PCT Pub. No.: WO2009/111385
PCT Pub. Date: Sep. 11, 2009

(65) Prior Publication Data
US 2011/0096395 A1  Apr. 28, 2011

Related U.S. Application Data

(60) Provisional application No. 61/034,007, filed on Mar. 5, 2008.

(51) Int. Cl.
*G02B 6/00* (2006.01)
*G02B 6/036* (2006.01)
*G02B 6/02* (2006.01)

(52) U.S. Cl.
CPC ............ *G02B 6/036* (2013.01); *G02B 6/02042* (2013.01); *G02B 6/02033* (2013.01); *G02B 6/02* (2013.01)
USPC ........................................................ 385/127

(58) Field of Classification Search
CPC .. G02B 6/02; G02B 6/02042; G02B 6/02033; G02B 6/036
USPC .................................................. 385/123–128
See application file for complete search history.

(56) References Cited

U.S. PATENT DOCUMENTS

| 5,554,831 A | 9/1996 | Matsukawa |
| 5,591,289 A | 1/1997 | Souders |

(Continued)

FOREIGN PATENT DOCUMENTS

| JP | 11-052146 | 2/1999 |
| JP | 2005-248369 | 9/2005 |

(Continued)

OTHER PUBLICATIONS

Intl Search Report for PCT/US2009/035685, 3 pages.

(Continued)

*Primary Examiner* — Charlie Peng
*Assistant Examiner* — Mary El Shammaa
(74) *Attorney, Agent, or Firm* — Jeffrey M. Olofson

(57) ABSTRACT

Polymer fibers are formed with concentric alternating layers of different polymer materials. The layers pairs have cross-sectional thicknesses selected for reflecting light at a selected visible wavelength. A cross-sectional dimension of the core is at least ten times an average of the selected thicknesses of the alternating layers. Some articles formed by the fibers are formed by attaching one fiber to another: the color of the fibers at the point of attachment is different from the colors of the fibers elsewhere. The fibers may be deformed to change its color properties by elongating the cross-section of the polymer fiber along a first cross-sectional axis. In some embodiments, the fibers are polarization sensitive.

19 Claims, 13 Drawing Sheets

(56) References Cited

U.S. PATENT DOCUMENTS

| | | |
|---|---|---|
| 5,773,375 A | 6/1998 | Swan |
| 5,881,196 A | 3/1999 | Phillips |
| RE36,323 E | 10/1999 | Thompson |
| 5,961,904 A | 10/1999 | Swan |
| 6,243,521 B1 | 6/2001 | Owaki |
| 6,307,992 B2 | 10/2001 | Yamashita |
| 6,326,094 B1 | 12/2001 | Asano |
| 6,335,094 B1 | 1/2002 | Owaki |
| 6,387,488 B1 | 5/2002 | Kumazawa |
| 6,447,630 B1 | 9/2002 | Disano |
| 6,524,691 B2 | 2/2003 | Sugawara |
| 6,776,933 B1 | 8/2004 | Chatwin |
| 6,893,711 B2 | 5/2005 | Williamson |
| 6,974,618 B2 | 12/2005 | Kumacheva |
| 7,327,923 B2 | 2/2008 | Hart |
| 7,356,229 B2 | 4/2008 | Ouderkirk |
| 7,356,231 B2 | 4/2008 | Ouderkirk |
| 7,362,943 B2 | 4/2008 | Ouderkirk |
| 7,386,212 B2 | 6/2008 | Ouderkirk |
| 7,406,239 B2 | 7/2008 | Ouderkirk |
| 7,526,164 B2 | 4/2009 | Ouderkirk |
| 7,599,592 B2 | 10/2009 | Benson, Jr. |
| 7,738,763 B2 | 6/2010 | Ouderkirk |
| 7,773,834 B2 | 8/2010 | Ouderkirk |
| 2002/0044754 A1* | 4/2002 | Yamashita et al. ............ 385/124 |
| 2003/0072546 A1* | 4/2003 | Shimada et al. ............... 385/102 |
| 2003/0165313 A1* | 9/2003 | Broeng et al. ................. 385/125 |
| 2004/0101262 A1* | 5/2004 | Fleming et al. ................ 385/125 |
| 2004/0209052 A1 | 10/2004 | Tam |
| 2004/0223715 A1 | 11/2004 | Benoit |
| 2005/0181695 A1 | 8/2005 | Yoshimura |
| 2005/0265678 A1* | 12/2005 | Manyam et al. ............... 385/127 |
| 2006/0193578 A1 | 8/2006 | Ouderkirk |
| 2006/0196948 A1 | 9/2006 | Weber |
| 2007/0009217 A1* | 1/2007 | Seifert .......................... 385/123 |
| 2007/0019917 A1 | 1/2007 | Bayindir |
| 2007/0053640 A1* | 3/2007 | Goell et al. .................... 385/123 |
| 2007/0080533 A1 | 4/2007 | Bleikholm |
| 2007/0147752 A1* | 6/2007 | Weisberg et al. ............. 385/123 |
| 2008/0055724 A1 | 3/2008 | Bluem |
| 2008/0057277 A1 | 3/2008 | Bluem |
| 2010/0230835 A1 | 9/2010 | Ouderkirk |

FOREIGN PATENT DOCUMENTS

| | | |
|---|---|---|
| RU | 2160798 | 12/2000 |
| WO | 2007/042177 | 4/2007 |

OTHER PUBLICATIONS

Written Opinion for PCT/US2009/035685, 3 pages.

* cited by examiner

COLOR SHIFTING MULTILAYER POLYMER FIBERS AND SECURITY ARTICLES CONTAINING COLOR SHIFTING MULTILAYER POLYMER FIBERS

CROSS REFERENCE TO RELATED APPLICATIONS

This application is a national stage filing under 35 U.S.C. 371 of PCT/US2009/035685, filed Mar. 2, 2009, which claims priority to U.S. Provisional Application No. 61/034,007, filed Mar. 5, 2008, the disclosure of which is incorporated by reference in its/their entirety herein.

FIELD OF THE DISCLOSURE

The disclosure relates to optical devices, and more particularly to optical articles that include layered polymeric fibers that impart color to light that is reflected or transmitted by the fibers, including secure articles, and more particularly to articles, for example passports, banknotes, credit and identity cards, and security tags that use multilayered polymeric fibers manifesting a specific color characteristic.

BACKGROUND

Many types of fibers used for making, for example, cloth, contain dyes or pigments to impart different colors to the fibers. These dyes and pigments typically operate by absorbing some wavelengths of light, while permitting other wavelengths to be reflected. Polymer fibers are a different class of fiber in that they impart color by selectively reflecting some wavelengths of the light and transmitting the other wavelengths. In the past, polymer fibers have used a planar construction of several alternating layers of different polymer materials: the refractive indices and thicknesses of the layers determine the wavelengths that are reflected and those that are transmitted. Fibers of planar layers are, however, difficult to manufacture and are limited to using materials that adhere well to each other.

One use for polymer fibers is in the manufacture of important articles, such as bank notes, securities, permit cards, identification cards (ID cards) or passports. These types of important articles are commonly provided with a number of security measures whose object is to make counterfeiting difficult, if not impossible. Several layers of security features are often used, which are chosen from different technology fields, manufactured by different suppliers, and embodied in different constituting parts of the security article. To break the security document, the counterfeiter would need to obtain all of the implied materials and to get access to all of the required processing technology, which is an extremely difficult task.

The manufacturing of a banknote, for example, requires a special banknote paper (which may contain watermarks, security threads, fibers, planchettes, luminescent particles, windows, foils, decals, coatings, etc.), which are imprinted with particular inks (which may contain security dyes, pigments and further security additives), using dedicated intaglio and other high-security printing equipment. Contrary to commercial printing applications, security printing relies on several different printing techniques combined together on the same document. More recently, banknotes have been provided with security foils and other add-ons, which are applied by dedicated equipment. The materials and the equipment needed to make a banknote are only available from specialized suppliers, and the banknote can only be produced via a high-security printing work by skilled operators.

The security thread is another traditional element of anti-falsification paper for banknotes and other security documents. Embedded security threads are particularly difficult to counterfeit, because a) the thread is made by a specialized vacuum deposition or other highly specialized technique, or is a multilayer film, but b) the thread needs to be incorporated into the printing substrate during the substrate's manufacturing step. This necessary access to two different manufacturing technologies constitutes an obstacle for would-be counterfeiters.

The first-generation security thread for currency was a metal- or a metallized polymer-strip, entirely buried within the currency paper, and authenticate-able either by looking at it in translucency, or by detecting its electric or magnetic properties with the help of a corresponding device. More sophisticated versions of the security thread include window-threads, which are partly buried within the paper and partly lie open at the surface of the paper. This allows for a direct visual authentication of the thread's overt security features at the sites where it appears at the paper surface.

One particular laminated window thread, comprising an optically variable interference coating manufactured by the vacuum deposition of a multi-layer interference stack onto a carrier plastic sheet, and subsequently protected by laminating a second plastic sheet over it. Currency paper containing such optical threads, which change color depending on the viewing angle, is currently available.

Vacuum coating is an expensive process, with a concomitantly high price for such threads. There is a need, therefore, to produce threads less expensively.

SUMMARY

One embodiment of the disclosure is directed to a secure article having a member having a first surface and a first multilayer polymer fiber on the first surface. "On the first surface" in this context means that at least a portion of the fiber is in contact with the first surface. The first polymer fiber comprises an arrangement of substantially concentric layers comprising alternating layers of a first polymer material having a first refractive index and a second polymer material having a second refractive index different from the first refractive index.

Another embodiment is directed to a secure article that has a first member having a first surface and a first multilayered polymer fiber proximate the first surface. The first multilayered polymer fiber has reflecting layers of at least a first polymer material and a second polymer material, layers of the first polymer material being disposed between layers of the second polymer material, at least one of the first and second polymer materials being birefringent. Thicknesses of the layers of the first polymer material and the layers of the second polymer material are selected so that the first multilayered polymer fiber reflects visible light within a selected portion of the visible spectrum in a first polarization state and incident perpendicular to a fiber longitudinal axis and transmits visible light in the first polarization state that lies outside the selected portion of the visible spectrum and incident perpendicular to the fiber longitudinal axis.

Another embodiment is directed to a method of verifying an article. The method includes illuminating with light a birefringent multilayer polymer fiber attached to the article. A wavelength range of light in at least a first polarization state of light reflected or transmitted from the multilayer polymer fiber is detected. An spectral fingerprint of the detected light is verified.

The above summary of the present disclosure is not intended to describe each illustrated embodiment or every implementation of the present disclosure. The figures and the detailed description which follow more particularly exemplify these embodiments.

BRIEF DESCRIPTION OF THE DRAWINGS

The disclosure may be more completely understood in consideration of the following detailed description of various embodiments of the disclosure in connection with the accompanying drawings, in which.

Figure 1A:
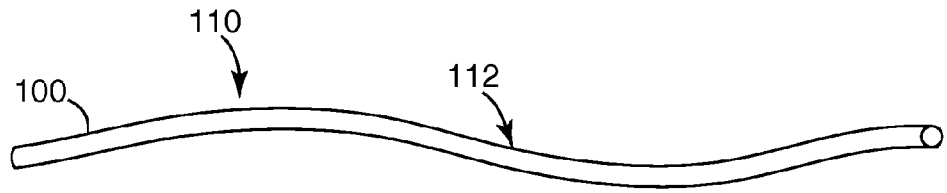
FIG. 1A schematically illustrates an exemplary multilayer, concentric polymer fiber according to principles of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure as defined by the appended claims.

DETAILED DESCRIPTION

The present disclosure is applicable to optical devices and is more particularly applicable to optical devices that use fibers to provide color effects. A new type of colored fiber is a polymer fiber that can appear to have different colors depending on various factors, such as the angle of the incident illuminating light and the polarization of the illuminating light. The polymer fiber may appear to produce different colors at different points along the fiber. None of these effects is dependent on the presence of a pigment or dye in the fiber.

The present disclosure is also applicable to secured articles, such as identification cards, passports, credit or debit cards, security tags, banknotes and the like, to protect against the fraudulent use or copying of such articles. Various levels or authentication techniques can be used, depending on various factors, such as, for example, the cost of the techniques relative to the value of the information or goods being protected. For example, banknotes include various features to reduce the possibility of forgery: banknotes can nowadays be provided with holographic threads in addition to more traditional anti-counterfeiting methods such as the use of watermarks and patterns that are hard to copy. According to the present disclosure, such secured articles are provided with a multilayer polymer fiber that is configured to provide specific color characteristics. For example, one color characteristic may be that it reflects light in only a specific color band when illuminated with white light, the wavelength of the color band being dependent on the incident angle of the illuminating light. In some embodiments, the color characteristics are dependent on the polarization of the incident light. It is difficult to manufacture such fibers without extensive technical knowledge and it is also difficult to replicate the optical performance of the fibers using substitute techniques. Accordingly, multilayer polymer fibers may be used to provide another security feature that enhances the security of such articles.

An embodiment of a polymer fiber 100 is schematically illustrated in FIG. 1A. An exemplary cross-section of the fiber 100 is provided in the FIG. 1B. The fiber 100 includes an arrangement of layers of a first polymeric material 102 disposed between layers of a second polymeric material 104. In some embodiments the first and second polymeric materials are isotropic, and their refractive indices are selected to be different from each other, so that the fiber 100 comprises a series of layers of alternating refractive index.

It is well known that an arrangement of alternating layers of different dielectric materials reflects light at a wavelength $\lambda$, where the optical thickness of the layers (the physical thickness times the refractive index) is an integer multiple of $\lambda/4$. Accordingly, where the thickness, $t_1$, of the layers 102 and the thickness, $t_2$, of the layers 104 are selected so that the optical thickness of the layers is an integer multiple of $\lambda/4$ for a selected wavelength, light at the selected wavelength is reflected by the fiber. Light at other wavelengths may be partially reflected and partially transmitted, or may be substantially all transmitted, depending on various factors, such as the difference in the refractive index between the alternating layers and the variation in thicknesses of the alternating layers. In addition, some of the light at the selected wavelength may be transmitted by the fiber, depending on the number of layers and the difference in the refractive index between the alternating layers. In some embodiments, the optical thickness of a pair of layers of the first and second polymer materials may sum to a value equal to λ/2. This approach may be useful where one of the polymer materials is substantially more expensive than the other, or is in short supply. In some embodiments, good reflectivity has been observed where the optical thickness of each of the reflecting layers is around one wavelength.

It will also be appreciated that the peak wavelength of the reflected light is dependent on the incident angle of the light on the fiber. FIG. 1C shows an exemplary graph, curve 120, of reflection, R, as a function of wavelength for light 110 incident at the fiber 100 in a direction that is approximately perpendicular to a longitudinal axis of the fiber 100. The wavelength at which peak reflection occurs is dependent on the refractive indices and thicknesses of the alternating layers 102, 104 of the fiber 100. In the illustrated example, the peak reflected wavelength is about 550 nm. The spread in reflection curve 120 is dependent on inter alia the variation in the thickness of the alternating layers 102, 104, the size of the refractive index difference between the alternating layers 102, 104 and the number of layers 102, 104. When the light 112 is incident at the fiber in a direction away from the normal to the longitudinal axis of the fiber, the value of the peak reflection wavelength becomes shorter. In the illustrated example the peak reflected wavelength shifts to about 500 nm. It will be appreciated that the fiber 100 may have some other value of peak reflected wavelength and that the width of the reflection peak (for example the full width, half maximum (FWHM) width) may be different from that in the illustrative example. For example, the peak reflected wavelength (for normally incident light) may be in the red region of the spectrum and shift towards the blue for light incident at higher angles. In addition, the peak reflected wavelength (for normally incident light) may lie in the near infrared and shift into the visible spectrum for light incident at high angles. Likewise, the peak reflected wavelength (for normally incident light) may lie in the blue region of the spectrum and shift into the near ultraviolet spectrum for light incident at high angles.

The fiber may have any suitable number layers 102, 104. In some embodiments only a few layers 102, 104 may be used, while in other embodiments the fiber may include hundreds of layers 102, 104. In some of the examples discussed below, the fibers include around one hundred pairs of alternating layers 102, 104.

Many different types of polymer may be used for the alternating layers 102, 104, including thermoplastic and thermosetting polymers that are transparent over the desired range of light wavelengths. In some embodiments, it may be particularly useful that the polymers be non-soluble in water. Further, suitable polymer materials may be amorphous or semicrystalline, and may include homopolymers, copolymers or blends thereof. Example polymer materials include, but are not limited to, poly(carbonate) (PC); syndiotactic and isotactic poly(styrene) (PS); C1-C8 alkyl styrenes; alkyl, aromatic, and aliphatic ring-containing (meth)acrylates, including poly (methylmethacrylate) (PMMA) and PMMA copolymers; ethoxylated and propoxylated (meth)acrylates; multifunctional (meth)acrylates; acrylated epoxies; epoxies; and other ethylenically unsaturated materials; cyclic olefins and cyclic olefinic copolymers; acrylonitrile butadiene styrene (ABS); styrene acrylonitrile copolymers (SAN); epoxies; poly(vinylcyclohexane); PMMA/poly(vinylfluoride) blends; poly(phenylene oxide) alloys; styrenic block copolymers; polyimide; polysulfone; poly(vinyl chloride); poly(dimethyl siloxane) (PDMS); polyurethanes; unsaturated polyesters; poly(ethylene), including low birefringence polyethylene; poly(propylene) (PP); poly(alkane terephthalates), such as poly(ethylene terephthalate) (PET); poly(alkane napthalates), such as poly (ethylene naphthalate) (PEN); polyamide; ionomers; vinyl acetate/polyethylene copolymers; cellulose acetate; cellulose acetate butyrate; fluoropolymers; poly(styrene)-poly(ethylene) copolymers; PET and PEN copolymers, including polyolefinic PET and PEN; and poly(carbonate)/aliphatic PET blends. The term (meth)acrylate is defined as being either the corresponding methacrylate or acrylate compounds. With the exception of syndiotactic PS, these polymers may be used in an optically isotropic form.

Several of these polymers may become birefringent when oriented. In particular, PET, PEN, and copolymers thereof, and liquid crystal polymers, manifest relatively large values of birefringence when oriented. Polymers may be oriented using different methods, including extrusion and stretching. Stretching is a particularly useful method for orienting a polymer, because it permits a high degree of orientation and may be controlled by a number of easily controllable external parameters, such as temperature and stretch ratio. The refractive indices for a number of exemplary polymers, oriented and unoriented, are provided in Table I below.

TABLE I

Typical Refractive Index Values for Some Polymer Materials

| Resin/Blend | S.R. | T (° C.) | $n_z$ | $n_x$ | $n_y$ |
|---|---|---|---|---|---|
| PEN | 1 | — | 1.64 | | |
| PEN | 6 | 150 | 1.88 | 1.57 | 1.57 |
| PET | 1 | — | 1.57 | | |
| PET | 6 | 100 | 1.69 | 1.54 | 1.54 |
| CoPEN | 1 | — | 1.57 | | |
| CoPEN | 6 | 135 | 1.82 | 1.56 | 1.56 |
| PMMA | 1 | — | 1.49 | | |
| PC, CoPET blend | 1 | — | 1.56 | | |
| THV | 1 | — | 1.34 | | |
| PETG | 1 | — | 1.56 | | |
| SAN | 1 | — | 1.56 | | |
| PCTG | 1 | — | 1.55 | | |
| PS/PMMA copolymer | 1 | — | 1.55-1.58 | | |
| PP | 1 | — | 1.52 | | |
| Syndiotactic PS | 6 | 130 | 1.57 | 1.61 | 1.61 |

PCTG and PETG (a glycol-modified polyethylene terephthalate) are types of copolyesters available from, for example, Eastman Chemical Co., Kingsport, Tenn., under the EASTAR brand name. CoPEN is a copolymer of napthalate and terephthalate ester moieties, and in the example listed in the table had a molar ratio of 90/10. THV is a polymer of tetrafluoroethylene, hexafluoropropylene and vinylidene fluoride, available from 3M Company, St. Paul, Minn., under the brand name DYNEON. The PS/PMMA copolymer is an example of a copolymer whose refractive index may be "tuned" by changing the ratio of the constituent monomers in the copolymer to achieve a desired value of refractive index. The column labeled "S.R." contains the stretch ratio. A stretch ratio of 1 means that the polymer sample was unstretched and was not oriented. A stretch ratio of 6 means that polymer sample was stretched to six times its original length. If stretched under the correct temperature conditions, the polymeric molecules are oriented and the material becomes birefringent. It is possible, however, to stretch the material without orienting the molecules. The column labeled "T" indicates the temperature at which the sample was stretched. The stretched samples were stretched as sheets without constraining the edges transverse to the stretch (z) direction. The columns labeled $n_x$, $n_y$, and $n_z$ refer to the birefringent refractive indices of the material. Where no value is listed in the table for $n_x$ and $n_y$, the values of $n_x$ and $n_y$ are the same as for $n_z$, and the material is isotropic. For some materials, for example PEN and PET, the refractive index is given for the isotropic state (unstretched, S.R.=1) and the birefringent state (stretched, S.R.=6).

Some polymer materials, for example fluorinated polymers such as THV, adhere to other polymer materials less well than others. This is a disadvantage when used in planar multilayer fibers, such as are used in the prior art, since the fibers can peel apart. In the concentric arrangement, adhesion is less important in keeping the fiber together, since the outer layers hold the inner layers in place.

Figure 2A:
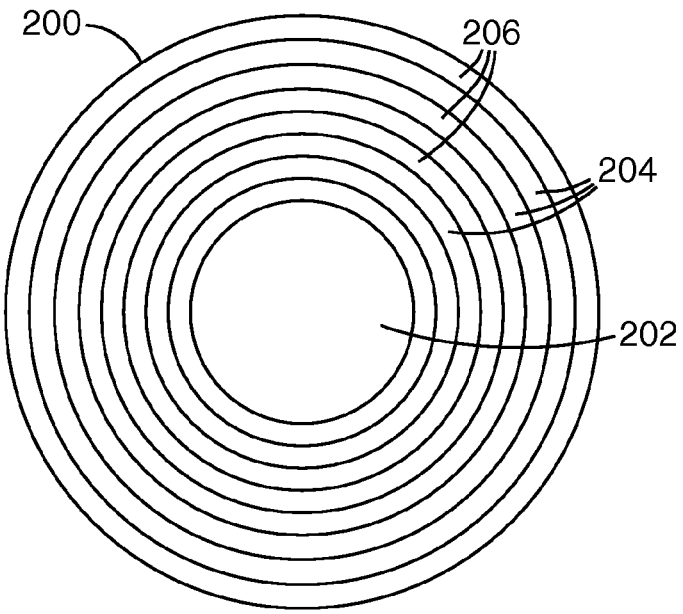
FIGS. 2A and 2B schematically illustrate exemplary cross-sections for concentric, multilayer polymer fibers according to principles of the present disclosure.

A cross-section of another embodiment of a polymer fiber 200 is schematically illustrated in FIG. 2A. In this embodiment, the fiber 200 has a core 202 at the center, with alternating layers 204, 206 of first and second polymer materials surrounding the core 202. The core 202 is typically larger is cross-sectional dimension than the cross-sectional thickness of the layers 204, 206. For example, the core 202 may have a cross-sectional dimension that is at least ten times the thickness of the layers 204, 206, or more. In the illustrated embodiment the fiber 200 is circular in cross-section, with the core 202 also circular, and the layers 204, 206 being annularly shaped, surrounding the core 202. In such a case, the cross-sectional dimension of the core 202 is its cross-sectional diameter. The fiber 200 need not be circular in cross-section, however, as is discussed below.

Figure 2B:
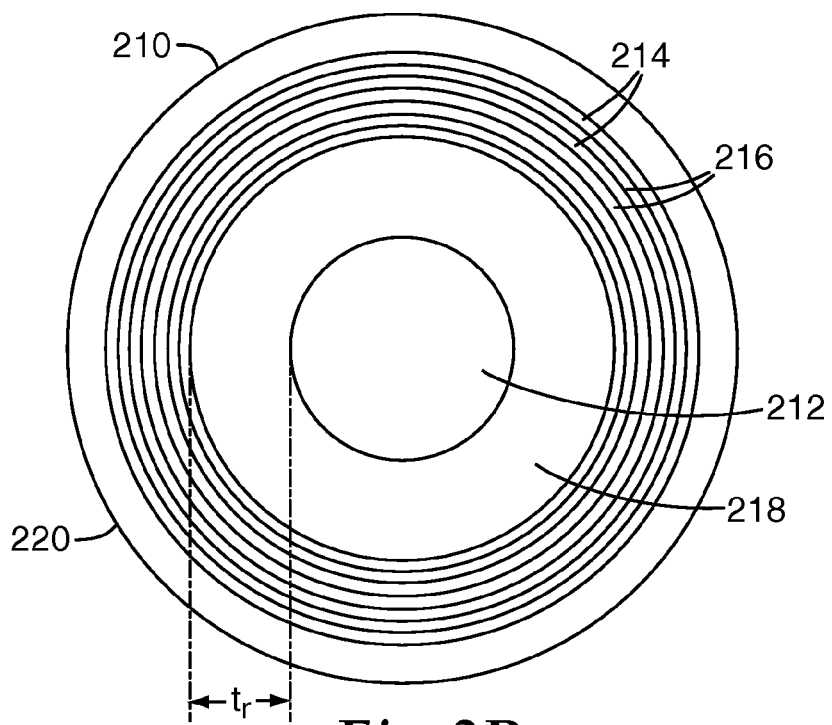

Another embodiment of a polymer fiber 210 is schematically illustrated in FIG. 2B. In this embodiment the fiber 210 has a core 212 surrounded by alternating layers 214, 216 of the first and second polymer materials. A ring 218 of material is disposed between the core 212 and the layers 214, 216. The cross-sectional thickness of the ring $t_r$ is relatively large compared to the thickness of the layers 214, 216 and may be at ten times thicker or more. In some embodiments the core 202, 212 is formed of the first polymer material, and the ring 218 may be formed of the second polymer material.

A core, with or without a ring, may be used to increase the cross-sectional dimension of the fiber without increasing the number of reflecting layers used in the fiber. Consider, for example, a fiber that has one hundred pairs of alternating polymer layers, where each pair has a combined thickness of around 360 nm. One hundred layer pairs results in a thickness contribution from the reflecting layers of 36 micrometers. In some applications it may be desirable to use fibers having a larger size. One reason why larger fibers may be desired in some applications is to increase the visibility and reflection cross-section of the fiber, while not necessarily increasing the layer thickness or number of layers in order to maintain spectral sharpness. Accordingly, a fiber that has a core, with or without a ring, may be substantially larger in cross-sectional dimension, which may be more suitable for some applications, and may be easier to handle. Additionally, the presence of a ring and core help in manufacturing. More specifically, when the fiber is extruded, the ring and core help divert volume of one or both of the polymers to balance the pressure at the exit of the extrusion die. Two melt polymers normally have two different flow rates. By preferentially diverting the lower flow rate polymer to the core, the pressure at the die exit can match the lower pressure of the high flow rate material. If the pressures do not match at the die exit, the higher pressure material overpowers the other and layer thickness becomes harder to control.

In some embodiments the fiber may include an outer sheath 220. The outer sheath 220 may be provided for protection of the fiber 220 or may be selected for specific surface properties. The outer sheath 220 may be formed of the first or second polymer materials, or may be formed of a different polymer material.

Multilayer fibers having different types of cross-sections may also be used. For example, multilayer fibers need not be circular in shape and may have some other shape, such as elliptical, rectangular or the like. For example, another exemplary embodiment of a fiber 300, schematically illustrated in cross-section in FIG. 3A, may be formed with concentric layers of alternating first polymeric material 302 and second polymeric material 304. In this embodiment, the fiber 300 is non-circularly symmetric and is elongated along one cross-sectional direction, illustrated as the x-axis. A cross-sectional direction is a direction lying perpendicular to the longitudinal axis of the fiber. Using the co-ordinate system of the figure, the fiber cross-section is elongated in the x-direction and, therefore, the cross-sectional dimension, $d_x$, in the x-direction is larger than the cross-sectional dimension, $d_y$, in the y-direction.

Figure 3A:
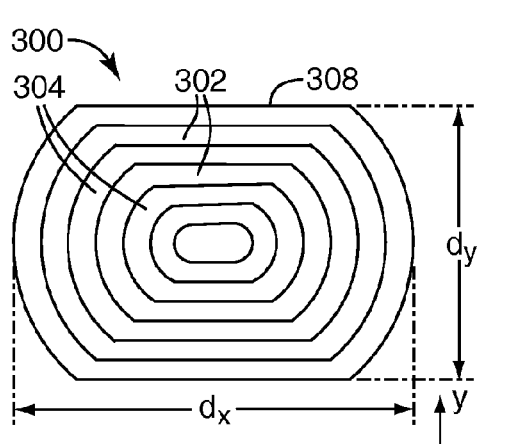
FIGS. 3A-3D schematically illustrate exemplary cross-section for multilayer polymer fibers according to principles of the present disclosure.
Figure 3B:
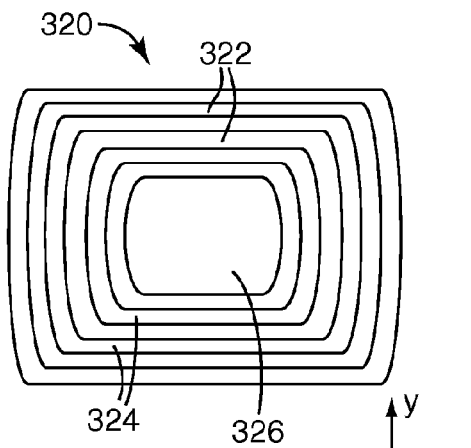

Another embodiment of a multilayer fiber 320, as schematically illustrated in FIG. 3B, has a non-circular cross-section and is formed of alternating layers 322, 324 surrounding a core 326. The core 326 may be formed of the same material as either of the layers 322, 324, or may be formed of a different material.

Figure 3C:
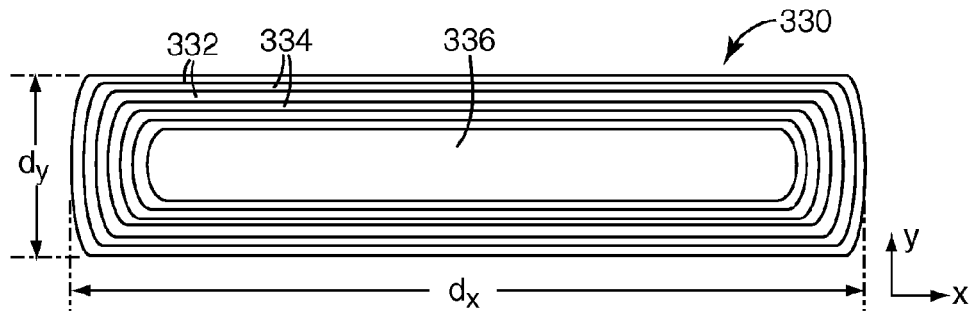

Another exemplary embodiment of a multilayer fiber 330, schematically illustrated in FIG. 3C, is formed from an arrangement of alternating layers of a first polymer material 332 and a second polymer material 334. In this embodiment, the fiber also has a core 336. The cross-sectional dimension of the fiber 330 in the x-direction is $d_x$ and the cross-sectional dimension in the y-direction is $d_y$. The fiber 330 is elongated in a direction parallel to the x-direction and the ratio $d_x/d_y$ may be any practical value. In some embodiments, the value of $d_x/d_y$ is greater than one, in other embodiments the value of $d_x/d_y$ is greater than 5 and in other embodiments the value of $d_x/d_y$ is greater than 10.

Figure 3D:
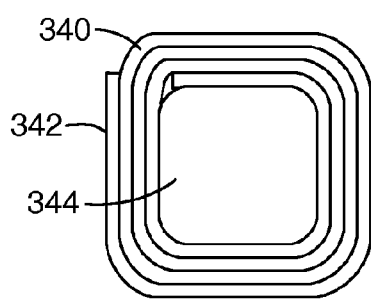

The cross-sectional fibers illustrated in FIGS. 1B, 2A, 2B and 3A-3C show discrete, concentric reflecting polymer layers. In other words, one layer of a first polymer material is physically separated from another layer of the same material by a layer of the second polymer material. This is not a necessary condition, however, and some embodiments of the disclosure may include a spiral wound fiber, for example as discussed in greater detail in U.S. Pat. No. 7,327,923, incorporated herein by reference. A spiral wound fiber is formed by rolling a multilayer polymer sheet. The sheet may be formed of two polymer layers, of first and second respective polymer materials. The sheet is rolled on itself or may be rolled around a core. One example of such a fiber 340 is schematically illustrated in FIG. 3D, which shows the fiber 340 formed of a multilayer sheet 342 would around a core 344. The fiber 340 may be stretched after winding so as to reduce the thickness of the layers of the sheet 342 to a desired value and, if desired, to orient the first and/or second polymer materials. Where the spiral wound fiber uses a core 344, the core 344 can have any desired cross-sectional shape, for example circular, square or rectangular, polygonal, or the like. In the illustrated example the core 344 has an essentially square cross-sectional shape, but with rounded corners to aid in winding. The spiral wound fiber may, of course, have as many wound layers as desired including, but not limited to, hundreds of wound layers. A spiral wound fiber is considered to have substantially concentric layers, even though the spiral wound layers are not discretely concentric.

Figure 4A:
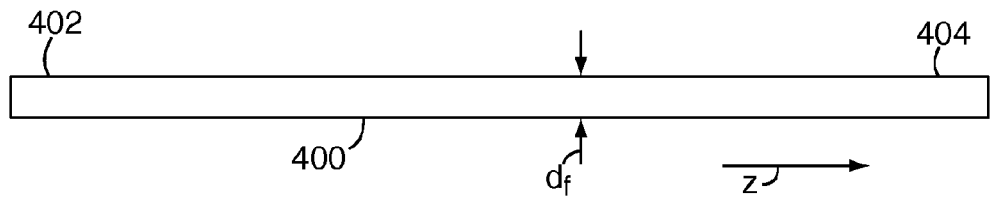
FIGS. 4A-4D schematically illustrate side views of different exemplary polymer fibers according to principles of the present disclosure.

The cross-sectional dimension of the polymer fiber may or may not be uniform along the length fiber. FIG. 4A schematically illustrates a side view of a fiber 400 that has a cross-sectional dimension, $d_f$, that is uniform along the length (z-direction) of the fiber 400. Accordingly, everything else being equal, the perceived color of the fiber 400 is the same at the first fiber end 402 as the second fiber end 404.

Figure 4B:
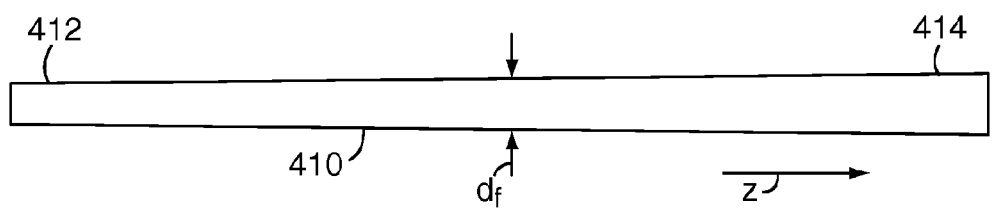

An embodiment of a fiber 410 whose cross-sectional dimension is not uniform along the length (z-direction) of the fiber 410 is schematically illustrated in FIG. 4B. In this embodiment, the fiber 410 is linearly tapered between the first end 412 and the second end 414, with the result that the fiber is thinner at the first end 412 than the second end 414. A variation in cross-sectional dimension, $d_f$, may be provided when the fiber is formed, for example during extrusion. The cross-sectional dimension may be varied by varying the process parameters, such as pressure on the polymers being fed into the extrusion die, the temperature of the polymers, the draw speed, and the like. In other approaches, the fiber may be subject to post-formation processing, for example a combination of stretching and/or compression while being heated. Consequently, the layer thickness of the fiber is greater when the fiber cross-sectional dimension is greater, and so the perceived color of the fiber 410 is not uniform along the fiber length. In the illustrated example, the reflected color at the first end 412 of the fiber 410 has a shorter wavelength than the reflected color at the second end 414 of the fiber 410.

Figure 4C:
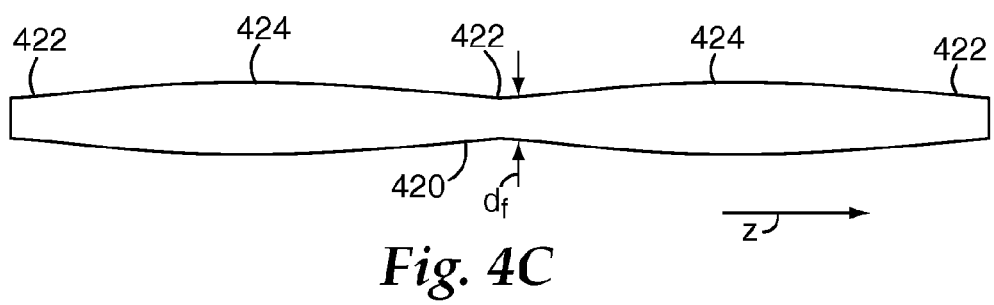

Another embodiment of a fiber 420 whose cross-sectional diameter is non-uniform along its length is schematically illustrated in FIG. 4C. In this embodiment, the value of the cross-sectional dimension, $d_f$, varies periodically along the length (z-direction) of the fiber 420. Periodic variations in the cross-sectional dimension may be produced during fiber formation, for example by varying the process parameters, such as pressure on the polymers being fed into the extrusion die, the temperature of the polymers, the draw speed, and the like. A periodic variation in cross-sectional dimension may also be imparted to the fiber in post-formation processing, for example by passing the fiber between two rollers whose separation is not constant. In this embodiment, a viewer perceives a color of shorter wavelength at the thinner portions 422 of the fiber 420, and a color of a longer wavelength at the thicker portions 424 of the fiber 440.

Figure 4D:
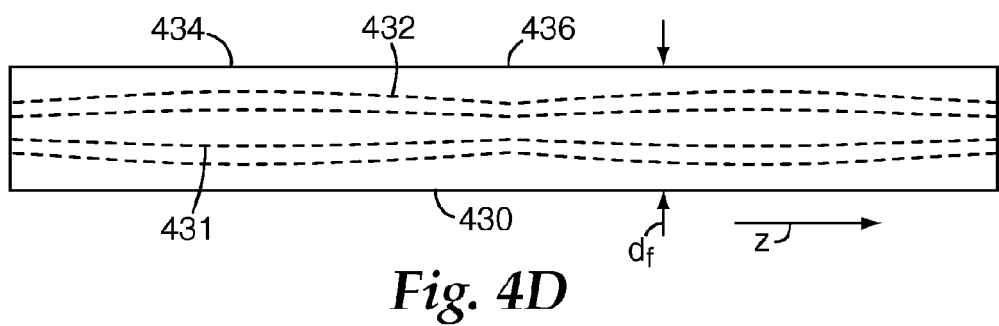

Another embodiment of a fiber 430 having a varying reflection spectrum along its length is schematically illustrated in FIG. 4D. In this fiber, the outer dimension, $d_f$, of the fiber 430 is constant. However, the thickness of the reflecting layers within the fiber is varied. This effect may be achieved when the fiber is originally extruded: the flow rate of the first and second polymer materials into the extrusion head remains constant, but the materials may be preferentially diverted to the core and ring, in which case the core and ring grow larger in diameter, with the reflecting layers shrinking in thickness, or the polymer materials are preferentially diverted to the reflecting layers, increasing the thickness of the reflecting layers and reducing the diameters of the ring and core. In the figure, the outer diameters of the core 431 and of the ring 432 are represented by the dashed lines. Thus, where the core 431 and ring 432 are larger, such as region 434 the reflecting layers are thinner, and region 434 preferentially reflects light of a shorter wavelength. Where the core 431 and ring 432 are smaller, for example region 436, the reflecting layers are thicker, and so region 436 preferentially reflects longer wavelength light.

Figure 5A:
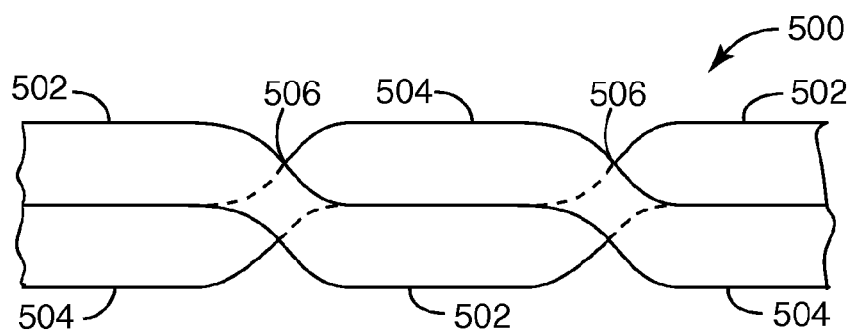
FIGS. 5A and 5B schematically illustrate articles using multiple polymer fibers according to principles of the present disclosure.

Different types of articles may be formed using multilayer fibers. A simple fiber tow 500 is schematically illustrated in FIG. 5A, in which two polymer fibers 502, 504 are positioned side-by-side. The fibers 502, 504 may have similar color properties, for example both fibers may appear to be the same color, or may have different color properties, for example one fiber may have a color different from the other fiber. The fibers 502, 504 overlap each other at overlapping regions 506, where the fibers 502, 504 are also attached to each other. The fibers 502, 504 may be attached to each other using, for example, an adhesive, or may be "welded" to each other, via the application of the heat and pressure. The colors of the fibers 502, 504 at the overlapping regions 506 may appear to be different from colors of the fibers 502, 504 where the fibers do not overlap. A number of factors may contribute to the change of color at the overlapping regions. First, the combined effect of reflection from each of the fibers 502, 504 in the overlapping region 506 results in a mixture of the colors of light reflected by the two fibers 502, 504. For example, in the non-overlapping regions the first fiber 502 may reflect blue light while the second fiber 504 reflects red light. At the overlapping regions 506, both blue and red light are reflected and so the overlapping regions appear to contain a mixture both red and blue light, i.e. purple light. Another factor may contribute to the change in color at the overlapping region is that the fiber layer thickness at the overlapping region 506 may be reduced due to the application of the heat and pressure when the fibers 502, 504 are attached to each other.

Figure 5B:
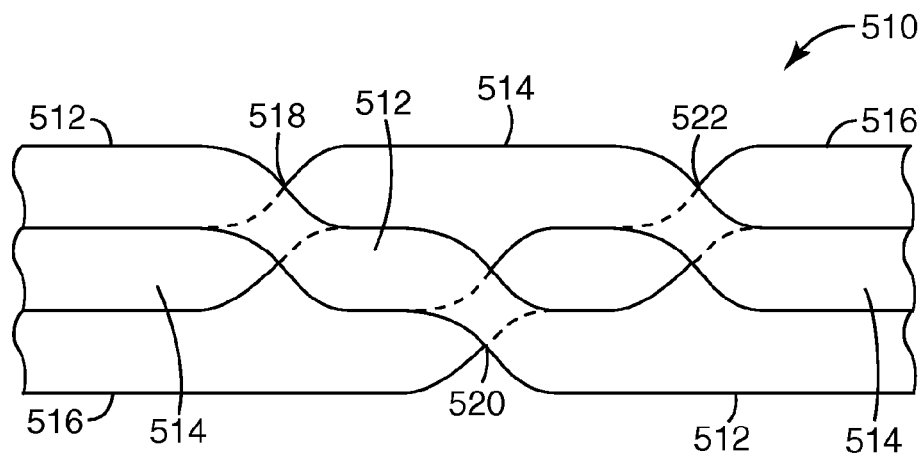

Another exemplary embodiment of a tow 510 is schematically illustrated in FIG. 5B. This tow 510 includes three fibers 512, 514, 516, which overlap at various overlapping regions. Overlapping region 518 includes an overlap between the first and second fibers 512, 514. Overlapping region 520 includes an overlap between the first and third fibers 512, 516. Overlapping region 522 is an overlap between the second and third fibers 514, 516. Different overlapping regions 518, 520, 522 may have different colors, depending on which particular fibers are overlapped. Although not shown in the illustration, it will be appreciated that more than two fibers may be overlapped at the same overlapping region. It will also be appreciated that a fiber tow may include a different number of fibers from those shown in the illustrative embodiments.

Figure 6A:
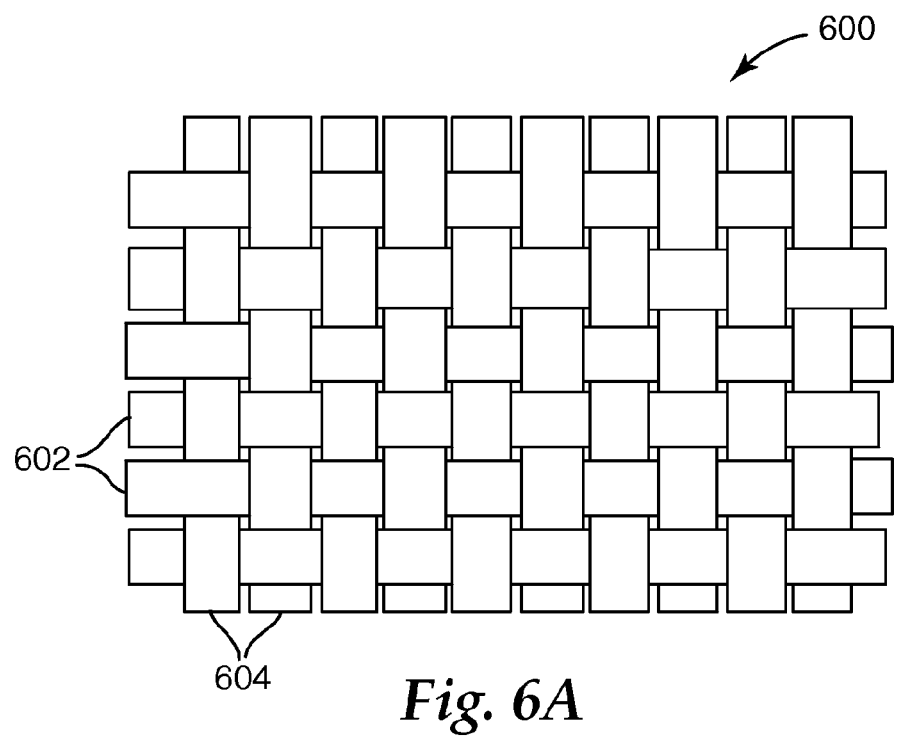
FIGS. 6A and 6B schematically illustrate woven articles using multiple polymer fibers according to principles of the present disclosure.
Figure 6B:
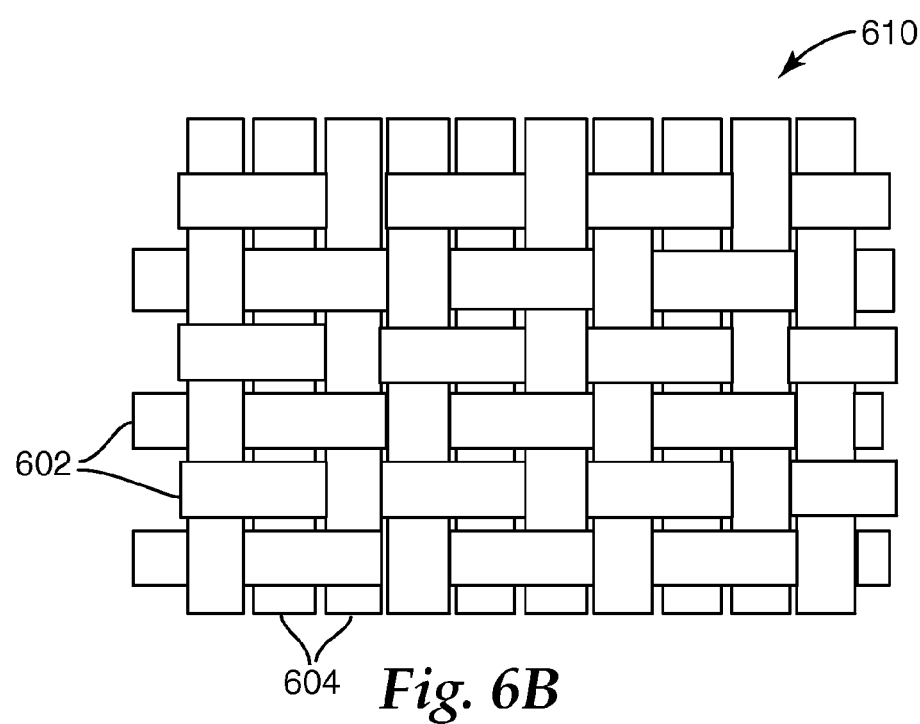

Another type of article that may use color shifting polymer fibers is a weave. One embodiment of a weave 600 that uses multilayer polymer fibers is schematically illustrated in FIG. 6A. Color shifting polymer fibers may form part of the warp 602 and/or part of the weft 604. The color shifting polymer fibers may all have the same color characteristics or may have different color characteristics. Other types of fibers may also be included in the weave 600, in the warp 602 or weft, 604 or in both the warp 602 and weft 604. Other types of fibers include, for example, inorganic fibers or non-color shifting polymer fibers. Suitable types of inorganic fibers include glass or glass/ceramic fibers, which may be added to provide desirable mechanical properties to the weave 600. An example of non-color shifting fibers includes homogeneous polymer fibers. The embodiment of weave 600 shown in FIG. 6A is a plain weave, although different types of weaves may be used, for example a satin weave or a twill weave. An example of a satin weave 610 is schematically illustrated in FIG. 6B.

In some embodiments of fiber weaves, the color shifting polymer fibers may simply be woven in with other fibers. In other embodiments, the color shifting polymer fibers may be attached to other fibers, for example at overlapping areas via a fiber weld or via the use of adhesive.

Figure 7:
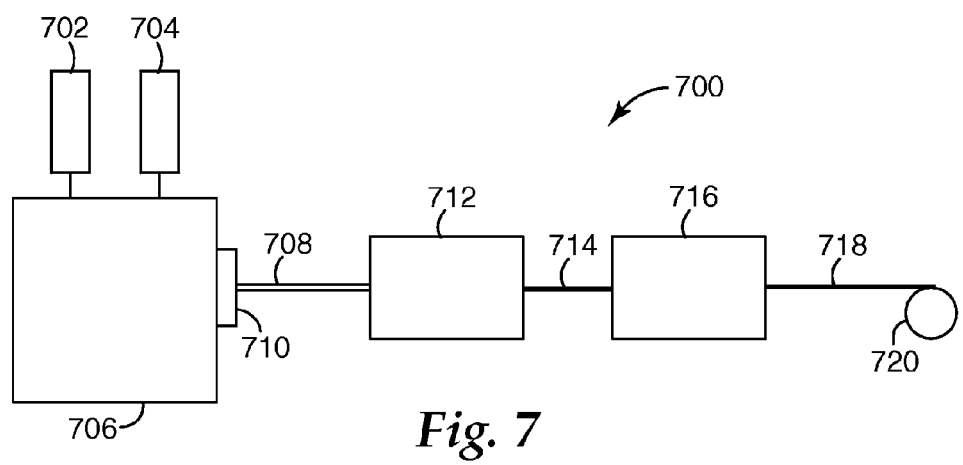
FIG. 7 schematically illustrates a system for manufacturing multilayer polymer fibers according to principles of the present disclosure.

A simplified diagram showing an exemplary manufacturing system 700 for making color shifting polymer fibers is schematically illustrated in FIG. 7. Two hoppers 702, 704 store the two polymers that are used for the alternating reflecting layers of the color shifting fiber. The hoppers 702, 704 feed the polymers into the extruder 706. The fiber 708 is extruded from the extrusion die 710. It will be appreciated that various elements of the system 700, such as rollers that pull the fiber 708 from the extruder 706, have been omitted from the diagram.

The extruder die 710 uses a number of shims that determine the size and number of the layers in the multilayer fiber. The design of the shims in the stack can be varied to adjust the thickness profile of the rings.

The fiber 708 may be sent to an optional stretcher station 712 where the fiber 708 is stretched by a desired amount. The stretcher station 712 may use, for example, sets of rollers operating at different speeds to perform the stretching. The stretching station 712 also includes heaters to heat the fiber 708 and the rollers to a desired temperature. Where it is desired that one or both of the fiber materials be birefringent, the stretching temperature is typically higher than the glass transition temperature of the polymer, which permits molecule orientation during the stretching process.

The stretched fiber 714 (or unstretched fiber 708 if the stretcher station is omitted), may be fed to a post-production processing station. The fiber may undergo various processes at this point. One such process is the adjustment of fiber cross-sectional dimension and/or the cross-sectional shape. One example of a device suitable to achieving a reduction in fiber cross-sectional dimension is a roller pair: the fiber is fed at an elevated temperature between a pair of pinch rollers whose separation is set to a desired value that is less than the dimension of the fiber. The heated fiber is then squeezed between the pinch rollers, with the result that the cross-sectional shape is changed and the fiber dimension is reduced. This process may be used, for example, to produce a fiber that is elongated along one cross-sectional direction (such as is illustrated in FIGS. 3A and 3C), from a fiber that was originally circular in cross-section. Since the separation between the rollers can be precisely controlled, the final dimension of the fiber can be controlled within acceptable tolerances. Another approach to changing the cross-sectional shape of a fiber is to crush the fiber between two plates. In both of these approaches the characteristics of the final product depend, at least in part, on various operational parameters such as the value of the transverse pressure, the length of time the fiber is subjected to the transverse pressure, the speed of the pinch rollers (if rollers are employed) and the temperature of the fiber when it is subjected to pressure.

The processed fiber 718 is then extracted from the post-production processing station 716 and may be collected on a roller 720 or stored in some other manner.

Figure 8:
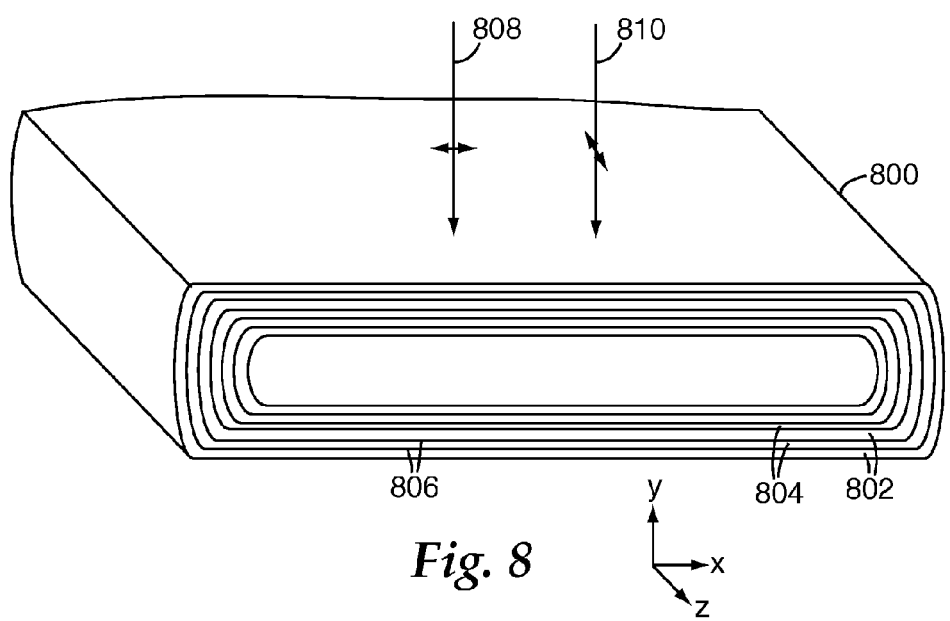
FIG. 8 schematically illustrates incidence of light relative to a birefringent, multilayer polymer fiber, according to principles of the present disclosure.

In some embodiments either the first or second polymer material of the multilayer fiber, or both first and second materials, may be birefringent. Referring now to FIG. 8, which shows a cross-section through an exemplary multilayer fiber 800 with respect to a coordinate system, the refractive indices in the x-, y-, and z-directions for the first fiber polymer material 802 may be referred to as $n_{1x}$, $n_{1y}$ and $n_{1z}$, and the refractive indices in the x-, y-, and z-directions for the second fiber polymer material 804 may be referred to as $n_{2x}$, $n_{2y}$ and $n_{2z}$. Where the material is isotropic, the x-, y-, and z-refractive indices are all substantially matched. Where the first fiber material is birefringent, at least one of $n_{1x}$, $n_{1y}$ and $n_{1z}$, has a value different from the others.

Within each fiber 800 there are multiple interfaces 806 formed between the layers of the first polymer material 802 and the second polymer material 804. For example, if the two materials present their x- and z-refractive indices at the interface, and $n_{1x} \neq n_{1z}$, i.e. the first material is birefringent, then the interface is birefringent.

The fiber 800 is disposed with its longitudinal axis generally parallel to the z-axis, as shown. The refractive index difference at the birefringent interfaces 806 within the fiber 800 for light 808 polarized parallel to the x-axis, $n_{1x}-n_{2x}$, may be different from the refractive index difference for light 810 polarized parallel to the z-axis, $n_{1z}-n_{2z}$. The interface is said to be birefringent when the difference in refractive index at the interface is different for different directions. Thus, for a birefringent interface, $\Delta n_x \neq \Delta n_z$, where $\Delta n_x = |n_{1x}-n_{2x}|$ and $\Delta n_y = |n_{1z}-n_{2z}|$.

For one polarization state, the refractive index difference at the birefringent interfaces 806 in the fiber 800 may be relatively small. In some exemplary cases, the refractive index difference may be less than 0.05. This condition is considered to be substantially index-matched. This refractive index difference may be less than 0.03, less than 0.02, or less than 0.01. If this polarization direction is parallel to the x-axis, then x-polarized light passes through the fiber 800 with little or no reflection. In other words, x-polarized light is highly transmitted through the fiber 800.

The refractive index difference at the birefringent interfaces in the fibers may be relatively high for light in the orthogonal polarization state. In some exemplary examples, the refractive index difference may be at least 0.05, and may be greater, for example 0.1, or 0.15 or may be 0.2. If this polarization direction is parallel to the z-axis, for example, then z-polarized light is reflected at the birefringent interfaces 806. Thus, z-polarized light is reflected by the fiber 800. A more detailed discussion of polarized fibers is included in U.S. application Ser. No. 11/468,746, incorporated herein by reference.

Thus, a fiber may reflect a select band of wavelengths for one polarization of incident light, but not reflect light polarized in the orthogonal polarization state.

In other embodiments, there may be no matching of refractive index for any incident polarization state, and so light is reflected for all incident polarization states. The thicknesses and refractive indices of the layers 802, 804 may be selected, however, to reflect a first color in one polarization state and another color in the orthogonal polarization state.

Figure 9A:
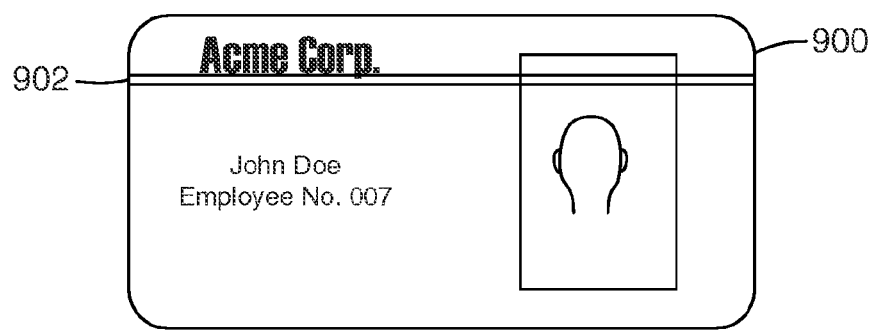
FIGS. 9A-9D schematically illustrate different embodiments of secured article that employ multilayer polymeric fibers, according to principles described in the present disclosure.

Various examples of secured articles that may employ a multilayer polymer fiber are schematically illustrated in FIGS. 9A-9D, although it should be appreciated that these examples are provided for illustration only and are not intended to constitute an exhaustive list. FIG. 9A schematically illustrates a card 900 that uses a multilayer polymer fiber 902. In the particular example the card 900 is an employee's identification card, but the card may be other types of cards, for example, a building or area access card, a credit or debit card, or the like. The card 900 may be provided with additional information about the holder, for example biometric data, employee information, account information and the like. Such information may be stored on the card 900 using conventional methods, such as being stored on a magnetic strip.

Figure 9B:

FIG. 9B schematically illustrates a security tag 910 having a multilayer polymer fiber 912. Luxury goods that are subject to the problem of counterfeiting may be provided with such a tag 910 by the goods' manufacturer to reduce the likelihood that a counterfeited copy of the article may be passed off as a genuine article.

Figure 9C:
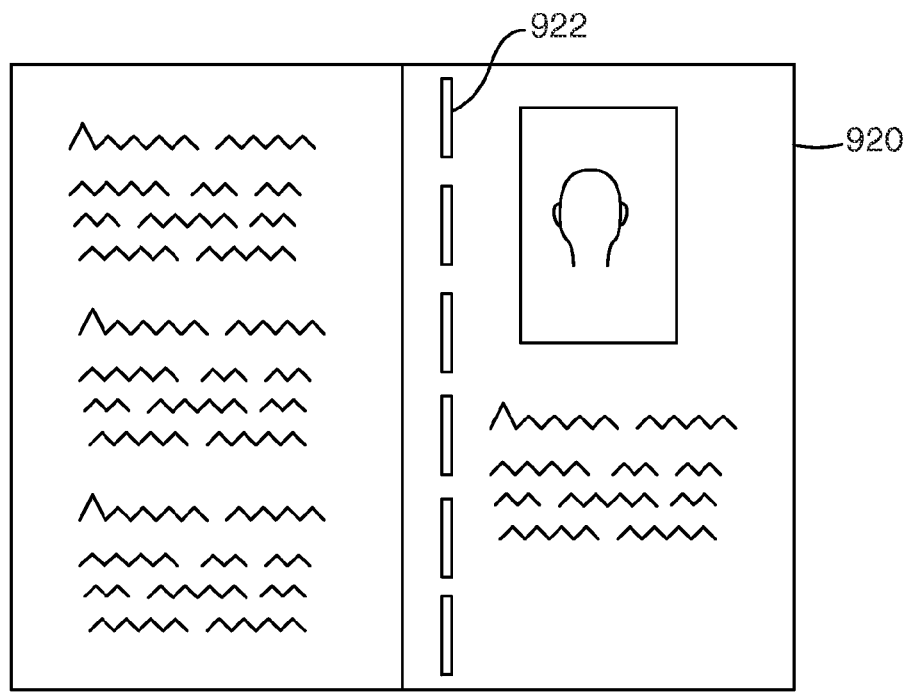

FIG. 9C schematically illustrates a book 920, for example, a passport, that includes a multilayer polymer fiber 922. In this example, rather than lying across the surface of the secured article as is shown in the previous two examples, the fiber 922 is woven into the page. It will be appreciated, of course, that the fiber 922 may lie on the surface of the page.

Figure 9D:

FIG. 9D schematically illustrates a banknote 930 having a multilayer polymer fiber 932 woven into the paper of the note 930.

The multilayer polymer fiber can appear to have different colors depending on various factors, such as the angle of the incident illuminating light and the polarization of the illuminating light. The polymer fiber may also appear to produce different colors at different points along the fiber. These effects are not dependent on the presence of a pigment or dye in the fiber, but are dependent on the internal structure of the fiber. Accordingly, the optical performance of the fiber cannot easily be replicated using less expensive, less sophisticated techniques.

Figure 1B:
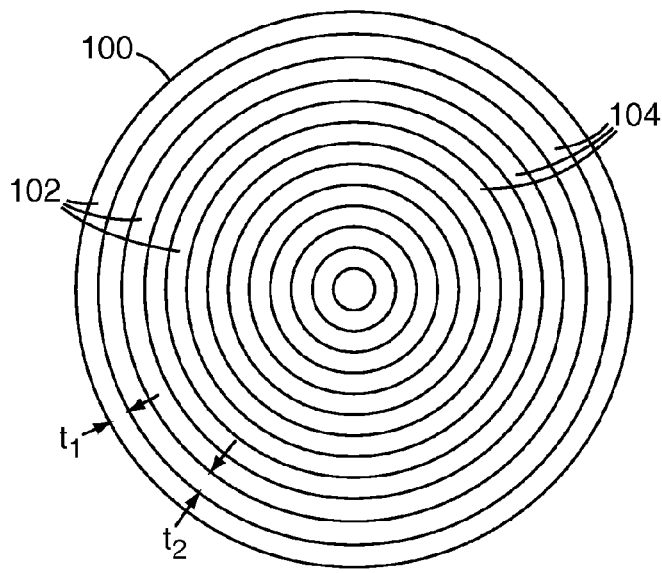
FIG. 1B schematically illustrates a cross-section of an exemplary multilayer concentric polymer fiber, according to principles of the present disclosure.
Figure 1C:
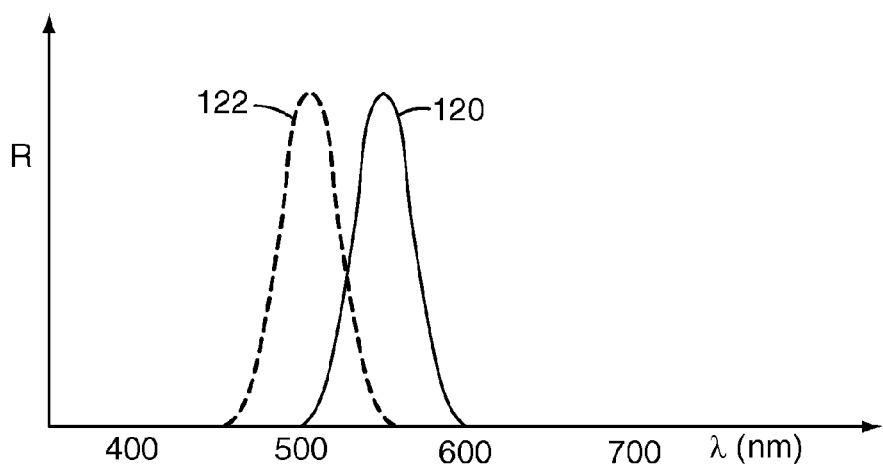
FIG. 1C shows exemplary reflection spectra for light incident perpendicular to the longitudinal axis of the fiber and non-perpendicular to the longitudinal axis.

An embodiment of a multilayer polymer fiber 100 is schematically illustrated in FIGS. 1A and 1B as discussed previously. The way in which the spectrum of the reflected (or transmitted light) changes with angle is dependent on known quantities and is constant over time, so long as the geometry of the fiber is maintained. Accordingly, a "spectral fingerprint" may be defined for a fiber which refers to the percent reflection and/or the percent transmission versus wavelength and angle of incidence of the incident light. The spectral fingerprint may be defined for light incident in a particular polarization state, or for unpolarized light.

Accordingly, articles that contain multilayer polymer fibers may be verified using both overt and covert methods. Overt verification does not require any specialized equipment for verification: one method of overt verification would be simply to tilt the article containing the fiber and observe a change in fiber color under ambient lighting conditions. Covert verification methods, on the other hand, use specialized equipment for verification. For example, a device may be used to quantify the color shift of the light reflected from the fiber when tilting the article through a specified angle.

In another example of covert verification, the light reflected by the fiber may be polarization analyzed to determine any difference in color shift for different polarizations of light. Polarization-dependent fibers are discussed at greater length below. In such a case, the article may be illuminated with polarized light, or the article may be illuminated with unpolarized light and the reflected light may be polarized before detection.

The fiber may have any suitable number layers 102, 104. In some embodiments only a few layers 102, 104 may be used, while in other embodiments the fiber may include hundreds of layers 102, 104. In some embodiments, the fiber may have at least 10 pairs of layers, or at least 20 pairs of layers, or more than 50 pairs of layers. In some of the examples discussed below, the fibers include around one hundred pairs of alternating layers 102, 104.

Many different types of polymer may be used for the alternating layers 102, 104, including thermoplastic and thermosetting polymers that are transparent over the desired range of light wavelengths, as discussed previously.

Figure 10A:
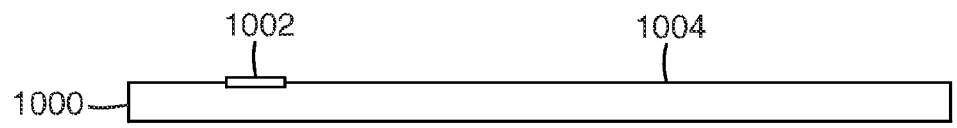
FIGS. 10A-10E schematically illustrate cross-sections through exemplary security articles that include multilayer polymer fibers according to principles described in the present disclosure.
Figure 10B:
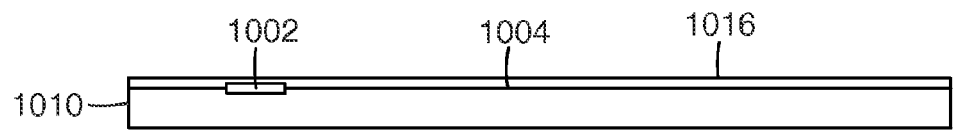

The multilayer polymer fiber may be applied to the article being secured using any suitable method. Generally, such methods will protect the fiber from releasing from the article prematurely. One method of attaching the fiber to the article is discussed with reference to FIG. 10A, which schematically illustrates a cross-section of an article 1000. In the illustrated embodiment, the article 1000 is a card, but it will be appreciated that this approach, and the others discussed below may be applied to other types of articles. The multilayer polymer fiber 1002 is attached to the surface 1004 of the article 1000 through heat lamination, which typically also flattens the fiber. In some embodiments, the fiber is completely flattened, but in other embodiments, residual curvature may be present in the fiber. This method may also change the color response as well as the color shift. The fiber 1002 may be attached to the surface 1004 using adhesive or may be laminated to the surface 1004. In the embodiment schematically illustrated in FIG. 10B, the article 1010 is provide with a thin lamination layer 1016 over the surface 1004 and the fiber 1002. The lamination layer 1016 may protect the fiber 1002 and other elements on the article from wear and tear.

Figure 10C:
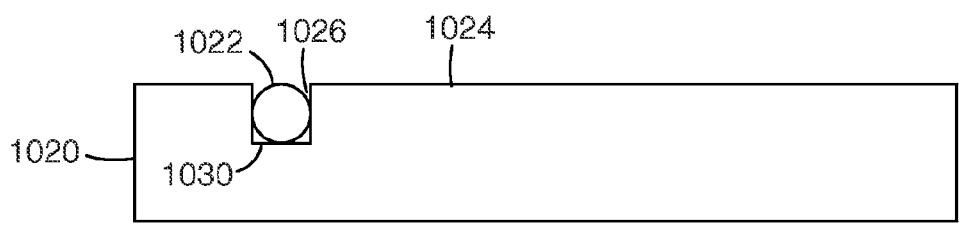
Figure 10D:
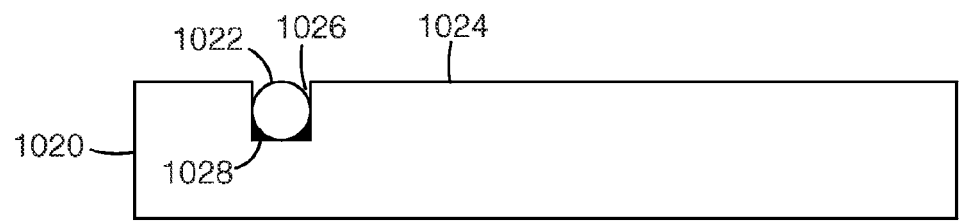

Another embodiment of article 1020 is schematically illustrated in FIG. 10C, in which the fiber 1022 is positioned within a recess 1026 on the surface 1024 of the article 1020. The recess 1026 may be provided in the form of a groove. The groove can have any suitable cross section, uniform or non-uniform. The figure (10c, 10d, 10e) shows a rectangular cross section. The fiber 1022 may be held within the recess 1026 using any suitable method. For example, the fiber 1022 may be held by a friction fit in the recess 1026. A lamination layer (not shown) over the surface may also be used to hold the fiber in the recess 1026. In some embodiments, an adhesive 1028 may be deposited in the recess 1026 to hold the fiber 1022, as is schematically illustrated in FIG. 10D. The inner surface 1030 of the recess 1026 and/or the adhesive 1028 may have a color that is selected to produce a desired optical effect along with the fiber 1022. For example, the fiber 1022 may be fabricated to reflect blue light when illuminated in a direction perpendicular to the fiber axis, in which case green and red light are typically transmitted through the fiber. Where the inner surface 1030 and/or the adhesive 1028 are black, no red or green light is reflected back through the fiber by the article 1022. On the other hand, where the inner surface 1030 and/or the adhesive 1028 are white, then the red and green light is reflected by the article back through the fiber 1022. The color of the surface 1030 and/or the adhesive 1028 need not be the same along the length of the recess, with the result that the light reflected from the fiber may appear to have a different color at different regions of the fiber 1022.

Figure 10E:
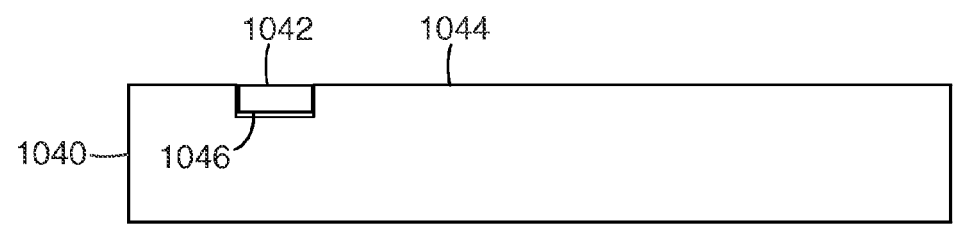

Another embodiment of an article 1040 is schematically illustrated in cross-section in FIG. 10E. In this embodiment, the fiber 1042 is located within a recess 1046 on the upper surface 1044 of the article 1040. In this embodiment, the fiber 1042 has a cross-section that is elongated along an axis perpendicular to the fiber's longitudinal axis. The fiber 1042 may be held in the recess by a friction fit, by a lamination layer (not illustrated) and/or adhesive (not shown), or by some other method. The figure shows one embodiment of the filling of the recess, in other embodiments it is envisioned that residual curvature may be present in the fiber.

Figure 11A:
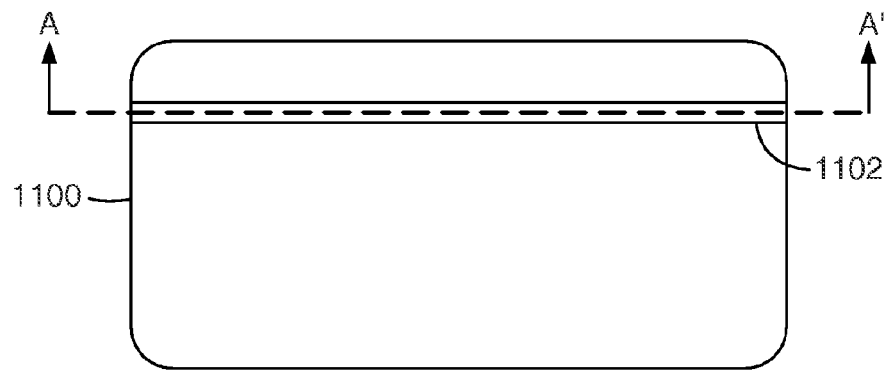
FIGS. 11A and 11B schematically illustrate plan and cross-sectional views respectively of a security article having a recess of nonuniform depth for a multilayer polymer fiber.
Figure 11B:
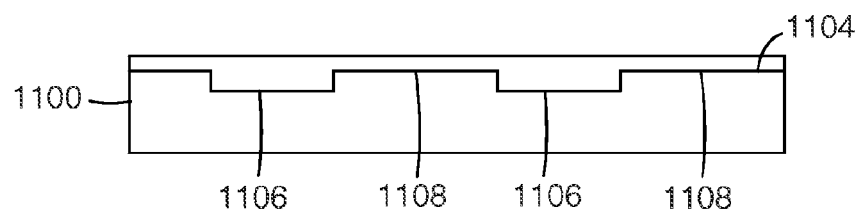

In some embodiments, the depth of the recess is not constant. One such embodiment is schematically illustrated in FIG. 11A, which shows a view of an exemplary article 1100 in the form of a card, and 11B, which shows the cross section of the article along the axis AA' as indicated in FIG. 11A. The multilayer polymer fiber 1102 sits in the recess 1104. The recess 1104 has deeper portions 1106 and shallower portions 1108. The fiber 1102 may be crushed into the recess 1104 so that the fiber's polymer layers in the shallower portions 1108 become thinner than the fiber's polymer layers in the deeper portions 1106, which may make the surface of the fiber 1102 uneven. Accordingly, the fiber preferentially reflects light at a shorter wavelength at the shallow portions 1108 than at the deeper portions 1106.

Figure 12:
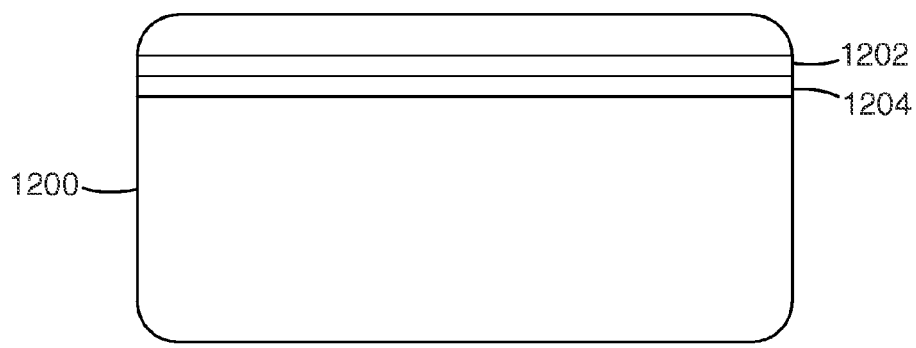
FIG. 12 schematically illustrates an embodiment of a security article that includes two multilayer polymer fibers according to principles described in the present disclosure.

Secure articles may be provided with more than one multilayer polymer fiber. One embodiment of an article 1200 having more than one fiber is schematically illustrated in FIG. 12. In this embodiment, the article 1200 has two fibers 1202, 1204 placed side by side. The fibers 1202, 1204 may be placed elsewhere on the article 1200. For example, the fibers 1202 may be positioned parallel but separated on the article, or the fibers 1202, 1204 may be positioned non-parallel to each other. The fibers 1202, 1204 may reflect the same color, or may reflect different colors.

Figure 13:
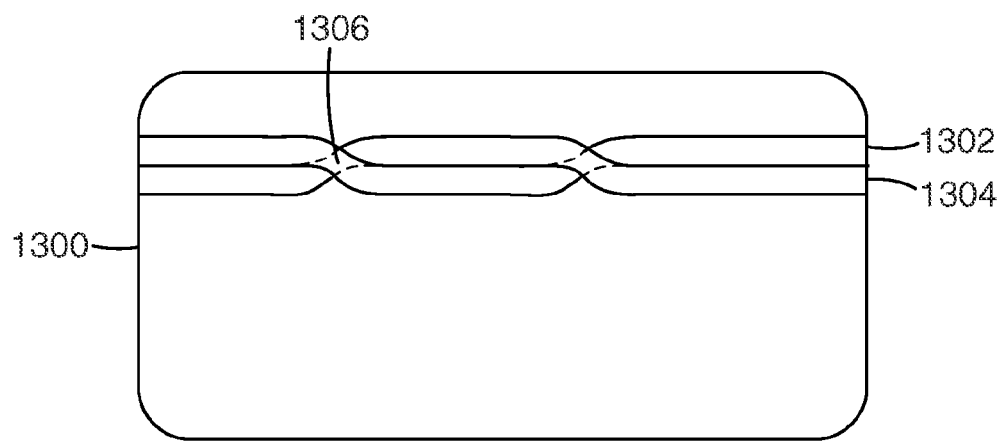
FIG. 13 schematically illustrates an embodiment of a security article that includes two crossing multilayer polymer fibers according to principles described in the present disclosure.

In other embodiments, multiple fibers may cross, for example as taught above with respect to the embodiment of FIG. 6A and as schematically illustrated in FIG. 13. In this embodiment, two multilayer polymer fibers 1302, 1304 are disposed on the article 1300. The fibers 1302, 1304 cross each other at overlapping regions 1306, where the color of the fibers 1302, 1304 may appear to be different from the colors of the fibers 1302, 1304 in non-overlapping regions.

Figure 14:
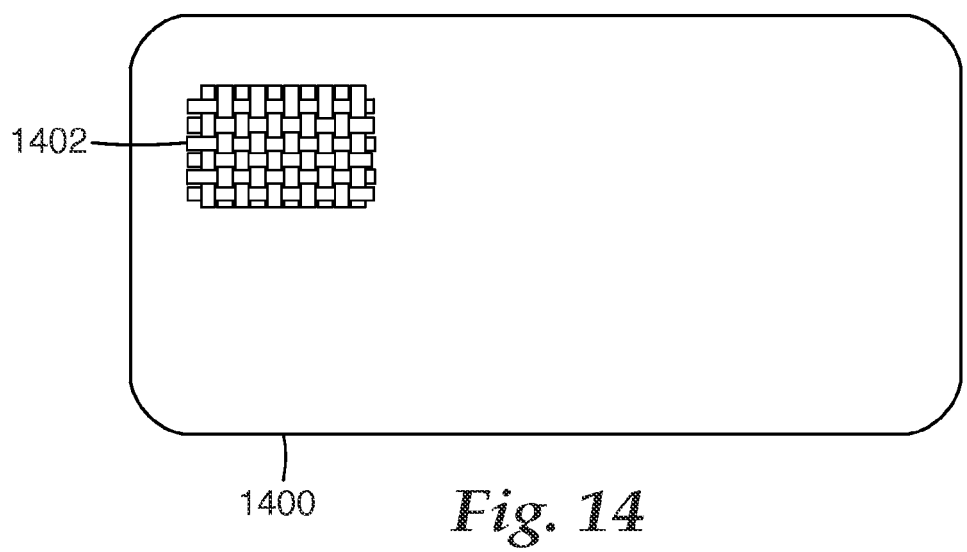
FIG. 14 schematically illustrates an embodiment of a security article that includes a weave of multilayer polymer fibers according to principles described in the present disclosure.

In other embodiments, multiple fibers may be employed with a secured article. In the embodiment of article 1400 schematically illustrated in FIG. 14, the article 1400 is provided with a patch of fiber weave 1402. The multilayer polymer fibers in the weave 1402 may all be of the same color or one or more fibers may have different colors.

Figure 15:
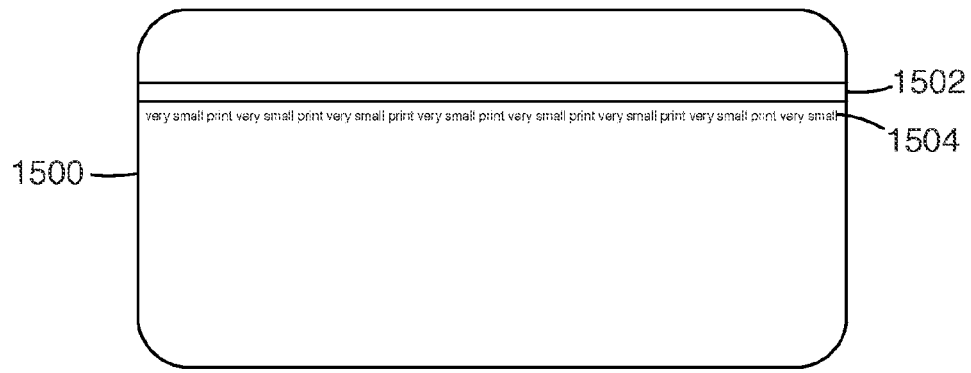
FIG. 15 schematically illustrates an embodiment of a security article that includes a multilayer fiber and security printing, exemplified as micro-text, according to principles described in the present disclosure.

The multilayer polymer fiber may be used in coordination with other features of the secured article. For example, the color of the multilayer polymer fiber may be selected to match or contrast with the color of another feature of the secured article. In an embodiment schematically illustrated in FIG. 15, the surface of the secured article 1500 includes a multilayer polymer fiber 1502 and one or more lines of microprint 1504. Microprint is printing that is extremely small and difficult to read with the naked eye. Magnification is normally required in order to distinguish the words (or letters or symbols) written in microprint. Without magnification, microprint can often be mistaken as a line on the article. In some embodiments, the color of the microprint 1504 is substantially the same as the color of the fiber 1502, for example when viewed at a particular angle.

Figure 16:
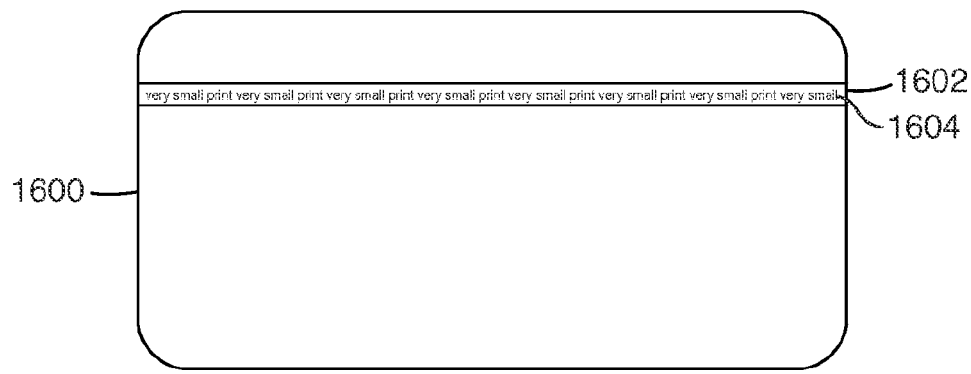
FIG. 16 schematically illustrates an embodiment of a security article that includes a multilayer fiber featuring microprinting or embossing, according to principles set forth in the present disclosure.

In another embodiment, schematically illustrated in FIG. 16, the article 1600 includes a multilayer polymer fiber 1602. A pattern 1604, for example small printed words, may be laser etched through the fiber on the article itself.

EXAMPLES

Example 1

Fiber Formation

A multilayer color concentric color shifting fiber was fabricated using the following process. A filament having multiple, alternating discrete concentric rings of an X polymer and a Y polymer was produced using an extrusion die that had 406 shims that were each 0.005" (125 micrometers) thick. Two shims were used to produce a thick inner ring, so this die was used to produce a fiber having an inner core, a ring surrounding the core and 202 reflecting layers surrounding the ring, similar to the fiber cross-section illustrated in FIG. 3B. The outer diameter of the ring was about 29%-65% of the total cross-sectional diameter of the fiber cross-sectional dimension, while the reflecting fiber layers contributed between about 30% and 70% to the fiber diameter. An outer sheath had a thickness that contributed about 1%-5% of the fiber diameter.

In some examples, the X polymer was LMPEN, a copolymer made from 90% PEN/10% PET available from 3M Company, St. Paul, Minn., and the Y polymer was PMMA supplied by Rohm and Haas (Philadelphia, Pa.). The core was formed from the X polymer and the ring was formed from the Y polymer. The sheath in the reported examples was formed of PMMA, although it could have been formed of LMPEN or some other suitable material.

The extruder die shims were formed using laser cutting and were specifically designed to provide a layer thickness that results in wavelength specific reflection after a specific forming and stretching process.

Solidified pellets of the two polymers were separately fed to one of two twin screw extruders. The extruders operated at a temperature in the range 260° C. to 300° C. and at screw speeds in the range 40-70 rpm. Typical extrusion pressures were in the range of about 2.1 MPa to about 21 MPa. Each extruder was equipped with a metering gear pump which supplied a precise amount of molten polymer to the filament spinning die. The size of each metering gear pump was 0.16 cc/revolution and these gear pumps were generally operated at speed in the range 10-80 rpm. The molten polymer was transferred from the metering pumps to the die using heated stainless steel neck tubes.

The molten polymer streams entered the die and flowed through the shims. The first shim pair created the core of the fiber, the second shim pair created the inner ring of the fiber, the third shim pair formed the innermost of the reflecting layers, and so forth. The discretely concentric multilayer fiber then exited the die and was introduced to a quench tank of water. The fiber was drawn into the water using a level winder. The combination of metering pump speed and winding speed controlled the diameter of the fiber. Typical speeds in the process were in the range of about 0.5 ms$^{-1}$ to about 4 ms$^{-1}$.

After extrusion, the multilayer fiber was stretched and oriented to develop color shifting properties for visible light by reducing the layer thickness to the size desired for visible light reflection. In the stretching process, the fiber was unwound and fed to a pull roll station, then through a convection oven and to another pull roll station and finally to a winder. The convection oven temperature was generally in the range of about 120° C. to about 182° C. The second pull roll station generally ran at about 2-6 times the speed of the first pull roll station and caused the fiber to stretch as it was heated in the oven. Typical pull roll speed for the first pull roll was about 0.2 ms$^{-1}$ while the second pull roll operated at about 0.4 ms$^{-1}$ to about 1.2 ms$^{-1}$. The winder ran at the same speed as the second pull roll station.

Various fibers were produced using the process discussed above. A summary of some of the resulting fibers is presented in Table II.

TABLE II

Summary of Fiber Formation

| Sample # | Input Dia (μm) | 1$^{st}$ roll speed (ms$^{-1}$) | 2$^{nd}$ roll speed (ms$^{-1}$) | Tension (g) | Output Dia. (μm) | Color |
|---|---|---|---|---|---|---|
| 1 | 375 | 0.17 | 0.6 | 11 | 198 | Input - gold<br>Output - purple |
| 2 | 337 | 0.17 | 0.29 | 4 | 254 | Input - gold<br>Output - green/blue |

TABLE II-continued

Summary of Fiber Formation

| Sample # | Input Dia (μm) | 1st roll speed (ms⁻¹) | 2nd roll speed (ms⁻¹) | Tension (g) | Output Dia. (μm) | Color |
|---|---|---|---|---|---|---|
| 3 | 550 | 0.17 | 0.34 | 38 | 385 | Input - light pink to green Output - gold with pink tint |
| 4 | 650 | 0.085 | 0.265 | 37 | 364 | Output - gold with pink tint |

In Table I, "Input Dia" refers to the diameter of the multilayer fiber input to the stretching station. The 1$^{st}$ roll speed and 2$^{nd}$ roll speed refer to the speeds of the 1$^{st}$ and 2$^{nd}$ pull rollers in the stretching station respectively. Tension represents the tension exerted on the fiber between the 1$^{st}$ and 2$^{nd}$ pull rollers. The oven temperature was kept at 138° C. in all examples. "Output Dia" represents the calculated diameter of the fiber output from the stretching station. The column labeled "Color" describes the perceived reflected color of the fiber input to the stretching station and output from the stretching station, under white light conditions at normal incidence.

The samples were all formed with the X polymer as LMPEN and the Y polymer as PMMA.

Example 2

Post-Processing

Various samples of the input fiber (550 micrometers diameter) used in Sample 3 were used to test the effects of compressing the fiber under pressure and heat. In each case the fiber was pressed in a Carver 3893 15-ton, automatic, four column, hydraulic press with air/water cooling capability in a press pad setup. A press pad setup is an assembly that has two press pads, each having a bottom, 0.57 mm thick metal plate, then a press pad (1.5 mm rubber pad between two felt pads each 1.5 mm thick) then a 1.5 mm thick polished metal plate. The fiber was placed between the two polished metal plates, which were heated. The assembly was pressed with a force of 5000 lb for 240 seconds. The resulting fiber dimension in the direction perpendicular to the plate surfaces was found to be repeatable under the same conditions of heat, pressure and time. The color shift of the fiber was observed to be different after compression. The results of the compression experiments are summarized in Table III below.

TABLE III

Compression Experimental Results

| No. | Temp ° C. | Force (lb) | Time (s) | Thick (μm) | Color (wh. bg) | Color (bl. bg) | Color (60°) |
|---|---|---|---|---|---|---|---|
| 5 | 120 | 5000 (22,000 N) | 240 | 320 | Green-gold | Orange-gold | Violet |
| 6 | 120 | 2500 (11,000 N) | 120 | 300 | Orange-gold | Green-gold | Green-blue |
| 7 | 120 | 5000 (22,000 N) | 400 | 200 | Green-blue | Green-blue | Orange |
| 8 | 132 | 7000 (31,000 N) | 380 | 150 | violet | Aqua | goldenrod |

The column "Temp" shows the temperature of the compression plates in degrees Celsius, and the column "Force" shows the force applied to the plates in pounds (values in Newtons (N) are also included). The column "Time" lists the time, in seconds, for which the fiber was exposed to the compression force and "Thick" lists the cross-sectional thickness of the resulting fiber in a direction perpendicular to the compression plate surfaces. The column "Color (wh. bg.)" lists the color of the compressed fiber in reflection with a white background, and "Color (bl. bg.)" lists the color of the compressed fiber in reflection with a black background. For both of these color descriptions, the color was measured with the direction of illumination perpendicular to the fiber (like light direction 210 in FIG. 2A). The column "Color (60°)" lists the color with the bulb at 60° to the observation angle (like light direction 212 in FIG. 2A, at 60° to the normal). The colors were observed using a Macbeth SPECTRALITE Model SPL-75B using the Cool White Fluorescent (CWF) bulb.

Example 3

Article

A three by three lattice of fibers was formed using the same fibers as in Example 2, with a spacing of about 2.5 cm between the fibers. The lattice was pressed in the press pad setup described in Example 2 at 120° C., 5000 lb for about 200 seconds. The fibers welded together at the overlapping sections, i.e. where the upper and lower fibers overlapped. A color shift was observed at the overlapping sections that was unique to the overlapping sections, and was not observed elsewhere on the fibers.

Example 4

Article

A three-fiber braid was created and then compressed in the press pad setup at 120° C. and 5000 lb for 200 seconds. The compressed, braided structure had a unique diamond shaped auxiliary color shift at the overlapping regions where the fibers crossed. The braiding fiber was pressed to a green-orange incident color, but the diamond overlapping regions were violet. At 60° to normal illumination, the fibers were blue-violet and the diamond-shaped overlapping regions were green-gold.

The present disclosure should not be considered limited to the particular examples described above, but rather should be understood to cover all aspects of the disclosure as fairly set out in the attached claims. Various modifications, equivalent processes, as well as numerous structures to which the present disclosure may be applicable will be readily apparent to those of skill in the art to which the present disclosure is directed upon review of the present specification. The claims are intended to cover such modifications and devices.

We claim:

1. A polymer fiber, comprising:
   a core formed of a polymer material; and
   an arrangement of discrete concentric layer pairs surrounding the core, each layer pair comprising a first layer of a first polymer material having a first refractive index and a second layer of a second polymer material having a second refractive index different from the first refractive index, the concentric layer pairs having cross-sectional thicknesses selected for reflecting light at a selected visible wavelength, a cross-sectional dimension of the core being at least ten times an average of the selected thicknesses of the first and second layers, and wherein at least one of the first and second polymer materials is birefringent; and wherein thicknesses of the layers of the first polymer material and the layers of the second polymer material are selected so that the fiber reflects visible light within a selected portion of the visible spectrum in a first polarization state and incident perpendicular to a fiber longitudinal axis and transmits visible light in the first polarization state that lies outside the selected portion of the visible spectrum and incident perpendicular to the fiber longitudinal axis.

2. A fiber as recited in claim 1, wherein the first and second layers have thicknesses selected to selectively reflect light at one visible wavelength and transmit light at a second visible wavelength.

3. A fiber as recited in claim 2 further comprising a ring of second polymer material between the core and the arrangement of discrete concentric layer pairs, the ring having a cross-sectional thickness least ten times an average of the selected thicknesses of the first and second layers.

4. An optical body, comprising:
   a first polymer fiber comprising a reflecting arrangement of substantially concentric, alternating layers of a first polymer material having a first refractive index and a second polymer material having a second refractive index different from the first refractive index; and
   at least a second polymer fiber comprising an arrangement of substantially concentric layers comprising alternating layers of a third polymer material having a third refractive index and a fourth polymer material having a fourth refractive index different from the third refractive index, a first portion of the first fiber being attached to the second fiber;
   wherein the portion of the first fiber attached to the second fiber reflects light of a first color different from a second color of light reflected from a second portion of the first fiber not attached to the second fiber, and wherein at least the first polymer fiber comprises polymer materials wherein at least one of the first and second polymer materials being birefringent; and wherein thicknesses of the layers of the first polymer material and the layers of the second polymer material are selected so that the first multilayered polymer fiber reflects visible light within a selected portion of the visible spectrum in a first polarization state and incident perpendicular to a fiber longitudinal axis and transmits visible light in the first polarization state that lies outside the selected portion of the visible spectrum and incident perpendicular to the fiber longitudinal axis.

5. An optical body as recited in claim 4, wherein the first fiber comprises a core of first polymer material, the core having a cross-sectional dimension at least ten times a cross-sectional thickness of an average of thicknesses of the alternating layers of first and second polymer material.

6. An optical body as recited in claim 4, wherein portions of the first fiber are unattached to the second fiber, at least some of the unattached portions of the first fiber having a substantially circular cross-section.

7. An optical body as recited in claim 4, wherein at least one unattached portion of the first fiber is unattached to the second fiber, the unattached portion of the first fiber comprising layers of the first and second polymer materials having cross-sectional thicknesses substantially constant along the unattached portion of the first fiber.

8. A method of making a polymer fiber, comprising:
   forming a polymer fiber having an arrangement of substantially concentric layers comprising alternating layers of a first polymer material having a first refractive index and a second polymer material having a second refractive index different from the first refractive index, the polymer fiber having a first cross-sectional shape; and
   changing the first cross-sectional shape of the polymer fiber to a second cross-sectional by elongating the cross-section of the polymer fiber along a first cross-sectional axis, wherein at least one of the first and second polymer materials is birefringent; and wherein the thicknesses of the layers of the first polymer material and the layers of the second polymer material are selected so that the first multilayered polymer fiber reflects visible light within a selected portion of the visible spectrum in a first polarization state and incident perpendicular to a fiber longitudinal axis and transmits visible light in the first polarization state that lies outside the selected portion of the visible spectrum and incident perpendicular to the fiber longitudinal axis.

9. A method as recited in claim 8, wherein forming the first polymer fiber comprises extruding the arrangement of substantially concentric layers.

10. A method as recited in claim 8, wherein forming the first polymer fiber comprises rolling a layered sheet around an axis, the sheet comprising at least one pair of layers, the pair of layers comprising at least a layer of the first polymer material and a layer of the second polymer material.

11. A polymer fiber, comprising:
    a first multilayered fiber comprising
    a central core formed of a polymer material; and
    reflecting layers of at least a first polymer material and a second polymer material, layers of the first polymer material being disposed between layers of the second polymer material, at least one of the first and second polymer materials being birefringent;
    wherein thicknesses of the layers of the first polymer material and the layers of the second polymer material are selected so that the fiber reflects visible light within a selected portion of the visible spectrum in a first polarization state and incident perpendicular to a fiber longitudinal axis and transmits visible light in the first polarization state that lies outside the selected portion of the visible spectrum and incident perpendicular to the fiber longitudinal axis.

12. A fiber as recited in claim 11, wherein the central core has a cross-sectional dimension at least ten times a cross-sectional thickness of a layer of the first polymer material and a layer of the second polymer material, wherein the core is formed of the first polymer material and further comprising a ring formed of the second polymer material between the core and the reflecting layers, a cross-sectional thickness of the ring having a value of at least tem times a cross-sectional thickness of a layer of the first polymer material and a layer of the second polymer material.

13. A secure article, comprising:
a member having a first surface; and
a first multilayer polymer fiber on the first surface, the first polymer fiber comprising an arrangement of substantially concentric layers comprising alternating layers of a first polymer material having a first refractive index and a second polymer material having a second refractive index different from the first refractive index, and wherein the first multilayered polymer fiber comprising an arrangement of substantially concentric layers comprises reflecting layers of at least a first polymer material and a second polymer material, layers of the first polymer material being disposed between layers of the second polymer material, at least one of the first and second polymer materials being birefringent; wherein thicknesses of the layers of the first polymer material and the layers of the second polymer material are selected so that the first multilayered polymer fiber reflects visible light within a selected portion of the visible spectrum in a first polarization state and incident perpendicular to a fiber longitudinal axis and transmits visible light in the first polarization state that lies outside the selected portion of the visible spectrum and incident perpendicular to the fiber longitudinal axis.

14. An article as recited in claim 13, wherein the first multilayer polymer fiber comprises at least ten pairs of layers, each pair of layers comprising a layer of the first polymer material and a layer of the second polymer material.

15. An article as recited in claim 13, wherein the first and second layers have thicknesses selected to selectively reflect light at one visible wavelength and transmit light at a second visible wavelength.

16. An article as recited in claim 13, wherein the first surface of the member comprises a recess, and the first polymer fiber is disposed in the recess.

17. An article as recited in claim 13, further comprising a second multilayer polymer fiber disposed proximate the first multilayer polymer fiber.

18. A method of verifying an article, comprising:
illuminating with light a multilayer polymer fiber attached to the article;
detecting a wavelength range of light in at least a first polarization state of light reflected or transmitted from the multilayer polymer fiber; and
verifying an spectral fingerprint of the detected light; wherein the multilayered polymer fiber comprises an arrangement of substantially concentric layers comprises reflecting layers of at least a first polymer material and a second polymer material, layers of the first polymer material being disposed between layers of the second polymer material, at least one of the first and second polymer materials being birefringent; wherein thicknesses of the layers of the first polymer material and the layers of the second polymer material are selected so that the first multilayered polymer fiber reflects visible light within a selected portion of the visible spectrum in a first polarization state and incident perpendicular to a fiber longitudinal axis and transmits visible light in the first polarization state that lies outside the selected portion of the visible spectrum and incident perpendicular to the fiber longitudinal axis.

19. A method as recited in claim 18, wherein verifying the spectral fingerprint of the reflected light comprises comparing detection signals generated by the light in the first polarization state with signals generated by reflected light in a second polarization state orthogonal to the first polarization state or determining a color shift for the light in the first polarization state.

* * * * *